(12) United States Patent
Nakajima et al.

(10) Patent No.: US 7,526,661 B2
(45) Date of Patent: Apr. 28, 2009

(54) PERFORMANCE STATE-BASED THREAD MANAGEMENT

(75) Inventors: Jun Nakajima, San Ramon, CA (US); Devadatta V. Bodas, Federal Way, WA (US)

(73) Assignee: Intel Corporation, Santa Clarra, CA (US)

( * ) Notice: Subject to any disclaimer, the term of this patent is extended or adjusted under 35 U.S.C. 154(b) by 320 days.

(21) Appl. No.: 11/003,561

(22) Filed: Dec. 2, 2004

(65) Prior Publication Data
US 2006/0123251 A1 Jun. 8, 2006

(51) Int. Cl.
G06F 1/26 (2006.01)

(52) U.S. Cl. .................................. 713/320; 713/300
(58) Field of Classification Search ................. 713/300, 713/320
See application file for complete search history.

(56) References Cited

U.S. PATENT DOCUMENTS

| | | | | |
|---|---|---|---|---|
| 5,745,778 | A | * | 4/1998 | Alfieri ............................ 712/1 |
| 6,098,169 | A | * | 8/2000 | Ranganathan ................ 712/227 |
| 6,240,521 | B1 | * | 5/2001 | Barber et al. ................ 713/323 |
| 6,501,999 | B1 | * | 12/2002 | Cai .............................. 700/82 |
| 6,622,253 | B2 | * | 9/2003 | Bacon ......................... 713/322 |
| 6,795,781 | B2 | | 9/2004 | Aldridge et al. |
| 6,829,713 | B2 | | 12/2004 | Cooper et al. |
| 6,904,594 | B1 | * | 6/2005 | Berry et al. .................. 718/100 |
| 6,925,573 | B2 | | 8/2005 | Bodas |
| 7,197,652 | B2 | * | 3/2007 | Keller et al. ................. 713/320 |
| 2004/0139138 | A1 | | 7/2004 | Chen et al. |
| 2004/0163001 | A1 | | 8/2004 | Bodas |
| 2005/0081183 | A1 | * | 4/2005 | Accapadi et al. ............ 717/100 |
| 2005/0138438 | A1 | | 6/2005 | Bodas |
| 2005/0240923 | A1 | * | 10/2005 | Duke ........................... 718/100 |
| 2006/0037024 | A1 | | 2/2006 | Bodas |
| 2006/0090161 | A1 | | 4/2006 | Bodas |
| 2006/0117316 | A1 | * | 6/2006 | Cismas et al. ................ 718/103 |

OTHER PUBLICATIONS

U.S. Appl. No. 10/982,613 (Title: Power Consumpton-Based Thread Scheduling; Inventor: Devadatta V. Bodas et al.; Filing Date: Nov. 3, 2004.
U.S. Appl. No. 11/393,393 ; Title: Performance State Management; Inventor: Devadatta V. Bodas; Filing Date: Mar. 30, 2006.

* cited by examiner

*Primary Examiner*—Chun Cao
(74) *Attorney, Agent, or Firm*—Kacvinsky LLC

(57) ABSTRACT

Systems and methods of managing threads provide for selecting a thread for execution and identifying a target performance state of a processor core based on the thread. Identifying the target performance state may include applying a priority of the thread to a mapping policy to obtain the target performance state. In one embodiment, a transition of the selected core to the target performance state can be initiated and the thread can be scheduled for execution by the processor core.

20 Claims, 3 Drawing Sheets

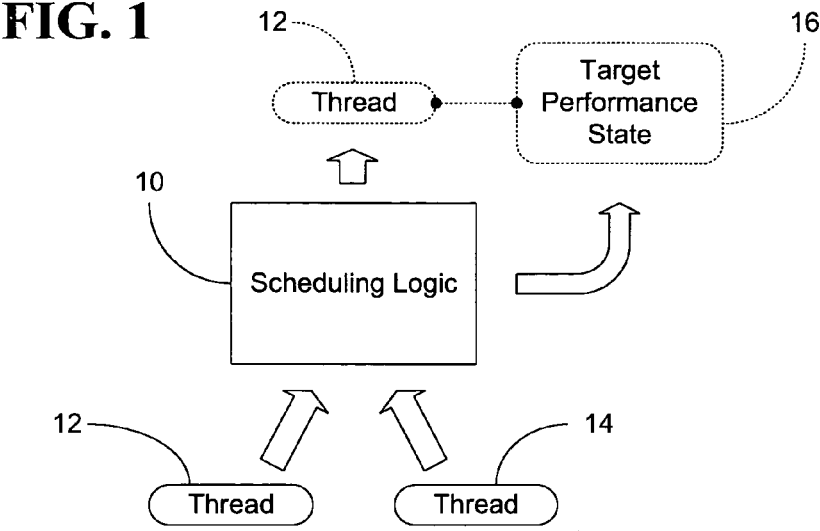
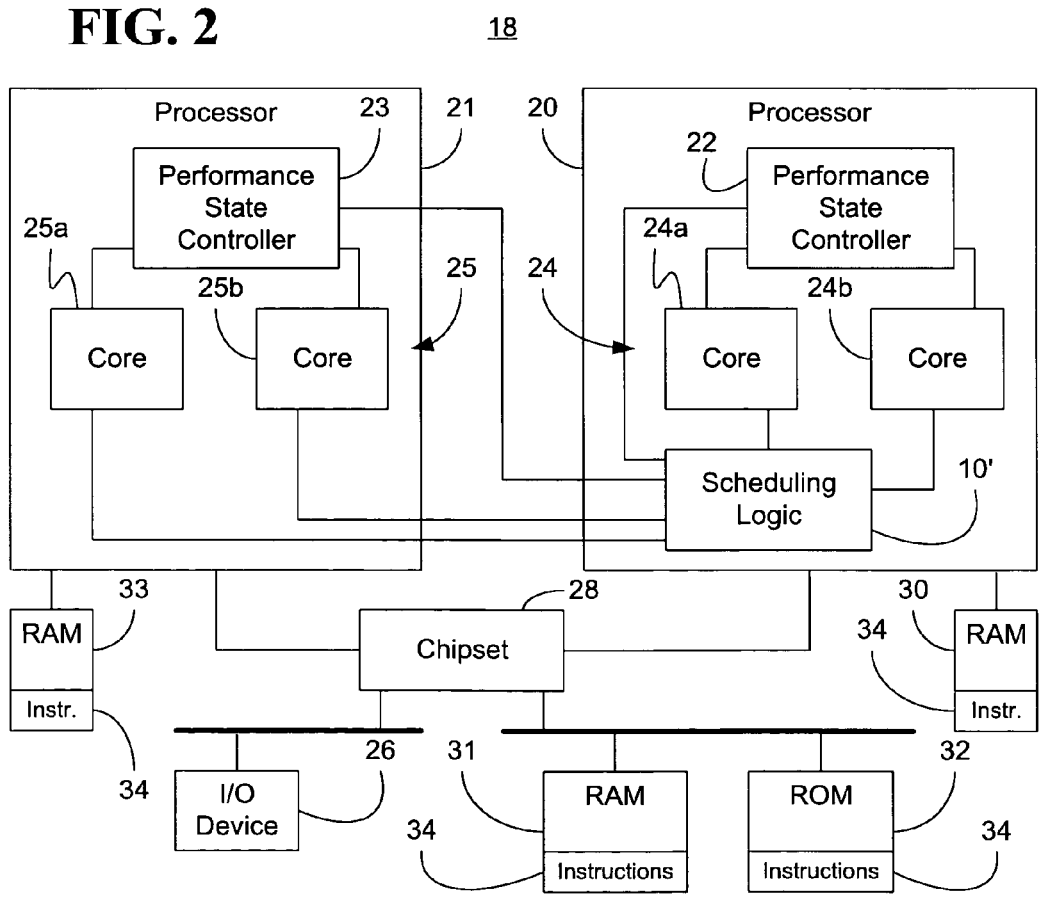

PERFORMANCE STATE-BASED THREAD MANAGEMENT

BACKGROUND

1. Technical Field

One or more embodiments of the present invention generally relate to thread management. More particularly, certain embodiments relate to thread scheduling based on target performance states.

2. Discussion

As the popularity of computing systems continues to grow, the number of challenges presented to designers and manufacturers also grows. For example, a desire to enhance processing performance has led to a number of advances in the scheduling of threads, which represent the workload for a computing system. Indeed, the selection of a thread may be based on factors such as priority, dependency of one thread over another, availability of resources and locality of instructions and data. While such advances could be helpful under certain circumstances, there remains considerable room for improvement.

BRIEF DESCRIPTION OF THE DRAWINGS

The various advantages of the embodiments of the present invention will become apparent to one skilled in the art by reading the following specification and appended claims, and by referencing the following drawings, in which:

FIG. 1 is a block diagram of an example of scheduling logic according to one embodiment of the invention;

FIG. 2 is a diagram of an example of a system according to one embodiment of the invention;

DETAILED DESCRIPTION

Figure 3:
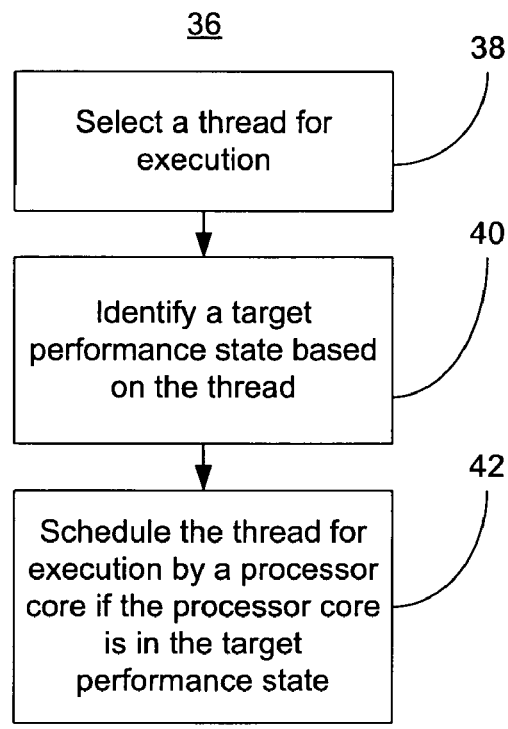
FIG. 3 is a flowchart of an example of a method of managing threads according to one embodiment of the invention.

In the following description, for purposes of explanation, numerous specific details are set forth in order to provide a thorough understanding of the embodiments of the present invention. It will be evident, however, to one skilled in the art that the embodiments of the present invention may be practiced without these specific details. In other instances, specific apparatus structures and methods have not been described so as not to obscure the embodiments of the present invention. The following description and drawings are illustrative of the embodiments of the invention and are not to be construed as limiting the embodiments of the invention.

FIG. 1 shows scheduling logic 10 that is configured to select between a plurality of threads 12, 14. The threads 12, 14 could be in a thread run queue (not shown), where each thread 12, 14 may be any part of a program, process, instruction set or application that can be run independently of other aspects of the program, process, instruction set or application. The scheduling logic 10 may be implemented in software as part of an operating system (OS), microcode, fixed functionality hardware such as complementary metal oxide semiconductor (CMOS) technology, or any combination thereof. In the illustrated example, the scheduling logic 10 selects the thread 12 for execution by searching the thread run queue for the thread with the highest priority. Other approaches to thread selection may also be used.

The illustrated scheduling logic 10 also identifies a target performance state 16 based on the thread 12, where the target performance state 16 defines a processor core performance capability. A tradeoff typically exists between the performance capability and available power savings. The performance capabilities of the states might be given by a table such as the following Table I.

TABLE I

| State | Frequency | Power |
| --- | --- | --- |
| P0 | 3.6 GHz | 90 W |
| P1 | 3.2 GHz | 75 W |
| P2 | 2.8 GHz | 55 W |
| P3 | 2.4 GHz | 40 W |

In one embodiment, the target performance state 16 is a processor performance state as described in the Advanced Configuration and Power Interface Specification (e.g., ACPI Specification, Rev. 3.0, Sep. 2, 2004; Rev. 2.0c, Aug. 25, 2003; Rev. 2.0, Jul. 27, 2000, etc.). Under the ACPI model, while a device or processor is in the P0 state, it uses its maximum performance capability and may consume maximum power; while a device or processor is in the P1 state, the performance capability is limited below its maximum and it consumes less than maximum power; and so on. As will be discussed in greater detail, one approach to identifying the target performance state is to apply a priority of thread to a mapping policy to obtain the target performance state.

By identifying the target performance state 16, the illustrated scheduling logic 10 provides a number of advantages over conventional approaches. For example, performance benefits can be achieved by scheduling higher priority threads to be executed by high performance processor cores. Similarly, power saving benefits can be achieved by scheduling lower priority threads to be executed by low performance processor cores. In addition, knowledge of the target performance state 16 could be used to initiate a transition of a processor core to the target performance state 16 if it is not already in that state. Furthermore, scheduling threads based on performance state rather than workload enables real-time application because workload-based scheduling typically involves the use of statistics. Low latency performance state switching further increases the attractiveness of real-time deployment. Other advantages can also be obtained through the identification of the illustrated target performance state 16.

Turning now to FIG. 2, a computing system 18 is shown, where the system 18 may be part of a server, desktop personal computer (PC), notebook PC, handheld computing device, etc. The illustrated system 18 has a first processor 20 with a performance state controller 22, a plurality of cores 24 (24a, 24b) and scheduling logic 10'. The scheduling logic 10' may be similar to the scheduling logic 10 (FIG. 1), already discussed, and each of the cores 24 can be similar to a Pentium® 4 processor core available from Intel® Corporation in Santa Clara, Calif. Each core 24 may therefore be fully functional with instruction fetch units, instruction decoders, level one (L1) cache, execution units, and so on (not shown).

The illustrated system 18 also has a second processor 21 with a performance state controller 23 and a plurality of cores 25 (24a, 25b), where the plurality of cores 25 can have similar functionality to the cores 24. The scheduling logic 10' may alternatively run on the second processor 21. Although the processors 20, 21 are shown as each having two cores, the number of cores in the processors 20, 21 may be greater or fewer than the number shown. For example, the processors 20, 21 could be single core processors. Furthermore, it can be seen that all of the cores 24, 25 need not be located on the same processor chip. Simply put, any processing architecture in which performance and/or power consumption are issues of concern can benefit from the principles described herein.

Notwithstanding, there are a number of aspects of multi-core, multi-processor architectures for which the embodiments of the invention are well suited.

The illustrated system 18 also includes one or more input/output (I/O) devices 26 and various memory subsystems coupled to the processors 20, 21 either directly or by way of a chipset 28. In the illustrated example, the memory subsystems include a random access memory (RAM) 30, 31 and 33 such as a fast page mode (FPM), error correcting code (ECC), extended data output (EDO) or synchronous dynamic RAM (SDRAM) type of memory, and may also be incorporated in to a single inline memory module (SIMM), dual inline memory module (DIMM), small outline DIMM (SODIMM), and so on. The memory subsystems may also include a read only memory (ROM) 32 such as a compact disk ROM (CD-ROM), magnetic disk, flash memory, etc. The illustrated RAM 30, 31, 33 and ROM 32 include instructions 34 that may be executed by the processors 20, 21 as one or more threads.

As already discussed, the scheduling logic 10' may select a thread for execution and identify a target performance state based on the selected thread. The scheduling logic 10' may also schedule the thread for execution if one or more of the processor cores 24, 25 have requested the target performance state. For example, the scheduling logic 10' may determine that the target performance state of a selected thread is the P3 state, where the cores 24a and 24b of the first processor 20 are in the P1 state and the cores 25a and 25b of the second processor 21 are in the P3 state. In such a case, the scheduling logic 10' could schedule the thread to run on the either core 24a or core 24b.

If, on the other hand, at least one of the processor cores 24, 25 is not in the target performance state, the scheduling logic 10' can also send a signal to one of the controllers 22 23 to initiate a transition of one or more of the cores 24, 25 to the target performance state. For example, the scheduling logic 10' may determine that the target performance state of a selected thread is the P3 state, where the cores 24a and 24b are in the P1 state and cores 25a and 25b are in the P2 state. In such a case, the scheduling logic 10' could send a signal to the controller 22 to initiate a transition of the second core 24b to the P3 state, then schedule the thread to run on the second core 24b. By transitioning the second core 24b to a deeper performance state, power can be saved.

Alternatively, the scheduling logic 10' could determine that the target performance state is shallower than the current state of one or more of the cores, and initiate a transition to the shallower target performance state. Such a transition could provide a performance boost.

It should be noted that some of the processor cores 24, 25 may share a performance state-dependent resource such as clock frequency or core voltage. For example, the cores 24a and 24b on the first processor 20 might share a clock frequency and core voltage setting and the cores 25a and 25b on the second processor 20 might share a clock frequency and core voltage setting. If so, an actual transition of a core to a target performance state may be constrained by the performance state requested by one or more remaining cores. For example, the scheduling logic 10' may determine that the target performance state of a selected thread is the P3 state, where the first core 24a has requested the P1 state and the second core 24b has requested the P3 state. The current state of cores 24 would therefore be the P1 state because it is the shallower of the two states. In such a case, the scheduling logic 10' could log the occurrence and schedule the thread to run on either the first core 24a or the second core 24b at the higher performance setting.

Turning now to FIG. 3, a method 36 of managing threads is shown. The method 36 may be implemented in a processing architecture as fixed functionality hardware, microcode, software, etc., or any combination thereof. Processing block 38 provides for selecting a thread for execution and processing block 40 provides for identifying a target performance state of a processor core based on the thread. The thread is scheduled for execution by the processor core at block 42 if the processor core is in the target performance state.

Figure 4:
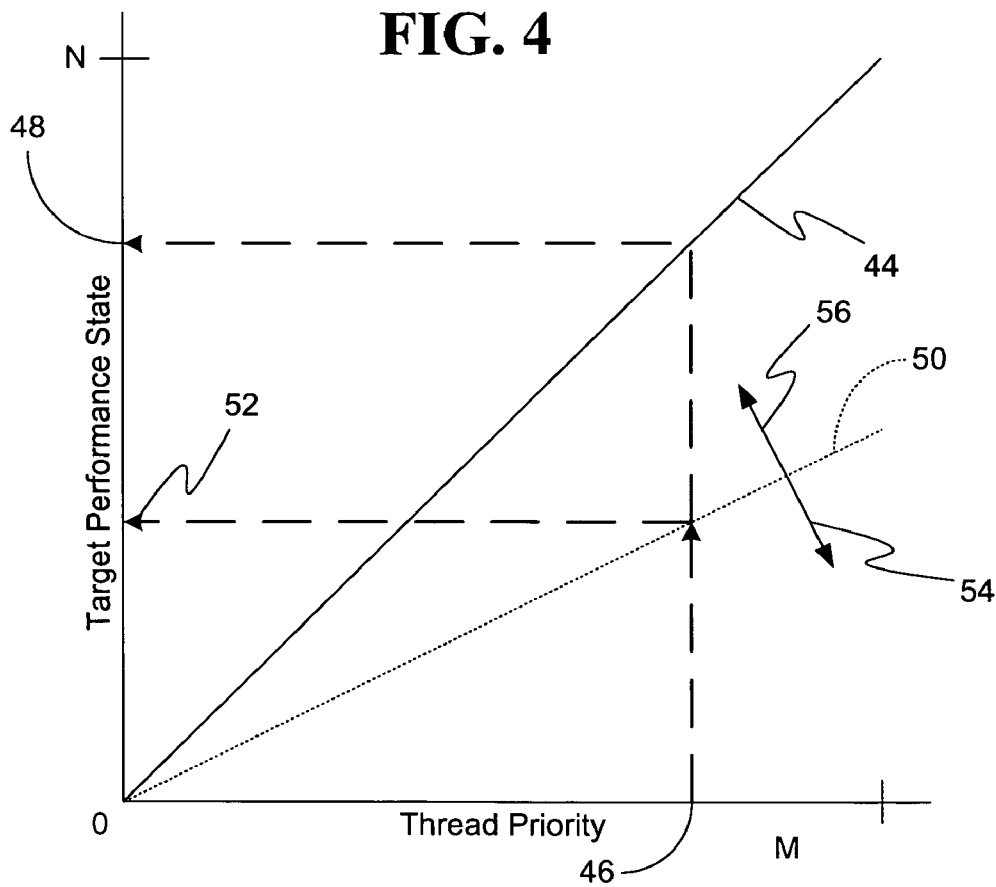
FIG. 4 is a plot of an example of a mapping policy according to one embodiment of the invention.

FIG. 4 demonstrates one approach to identifying a target performance state. In the illustrated example, a mapping policy 44 maps a given thread priority to a target performance state in a system having "M" thread priorities and "N" performance states. The deepest performance state is the Nth performance state, which enables maximum power savings for the core in question, and the lowest priority thread is the Mth thread. In particular, a thread priority 46 maps to a target performance state 48 under the illustrated mapping policy 44. The illustrated mapping policy 44 has been normalized to provide for utilization of all possible performance states.

A modified mapping policy 50 can be used, where less than all of the performance states are utilized and the same thread priority 46 maps to a shallower target performance state 52 than the performance state 48. The mapping policy is therefore fully configurable and can be modified based on the status of the system. For example, the mapping policy 50 could change based on whether the system is alternating current (AC)-powered or battery-powered. In one embodiment, an upper threshold may be established, where a performance characteristic of the mapping policy can be increased if the number of threads in the thread run queue is above the upper threshold. Such a modification is represented by a performance-oriented arrow 54. Thus, as the number of pending threads grows, the scheduling logic can reduce the backlog by increasing performance (i.e., decreasing the tangent angle). Similarly, a lower threshold can be established, where a power saving characteristic of the mapping policy can be increased if the number of threads in the thread run queue is below the lower threshold. Such a modification is represented by a power saving-oriented arrow 56. Thus, if there are a few number of threads remaining and their priority is low, the processor core(s) can be run at a deeper performance state to conserve more power. The upper and lower thresholds may be the same, depending upon the circumstances.

Figure 5:
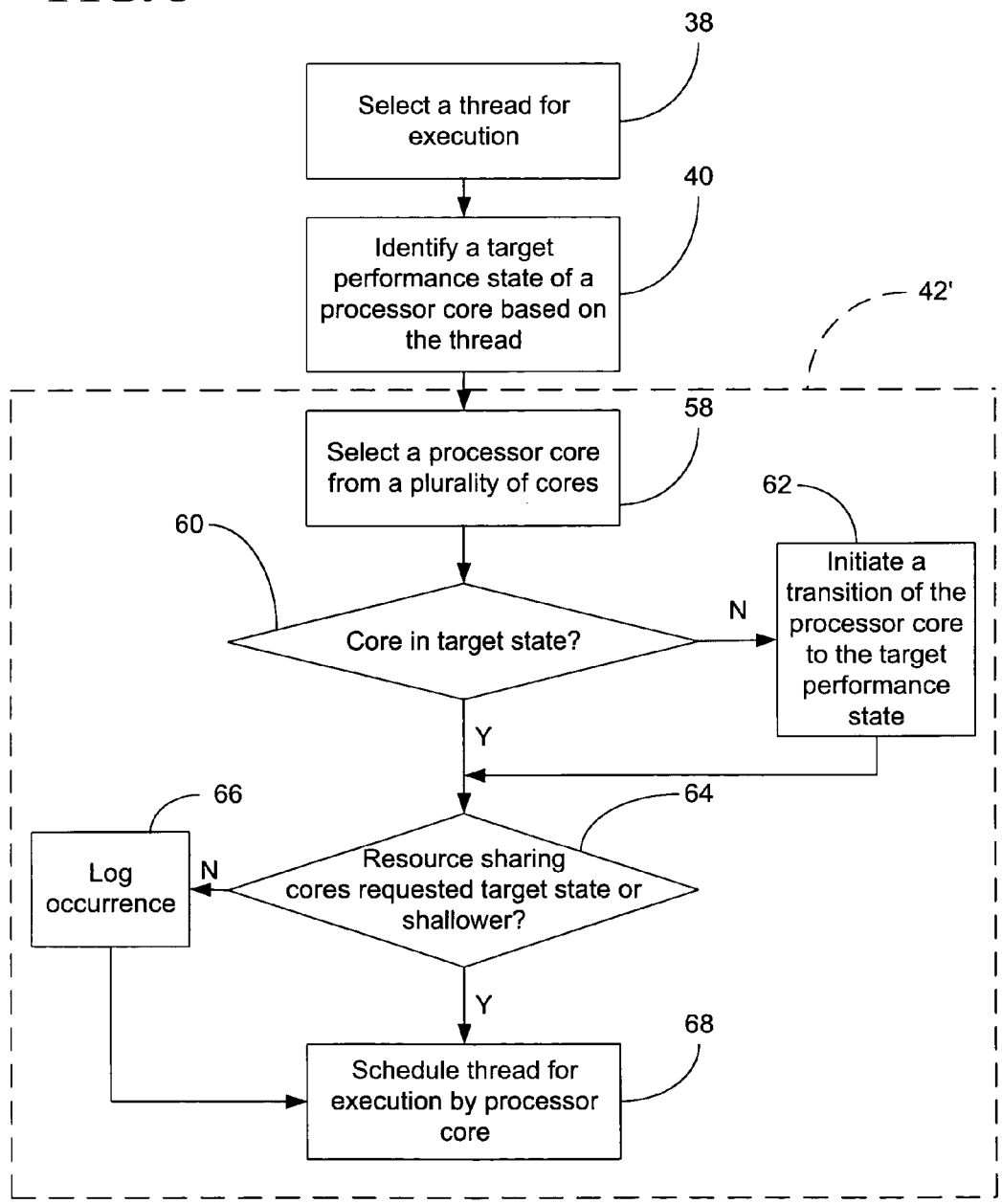
FIG. 5 is a flowchart of an example of a process of scheduling a thread according to one embodiment of the invention.

Turning now to FIG. 5, one approach to scheduling a thread for execution once a target performance state has been identified is shown at block 42'. In the illustrated example, multiple processor cores are present. In particular, block 58 provides for selecting a processor core from a plurality of processor cores and block 60 provides for determining whether the selected processor core is in the target performance state. If not, a transition of the selected processor core to the target performance state is initiated at block 62. As already mentioned, one approach to initiating the transition at block 62 is to transmit a signal to a performance state controller 22 (FIG. 2). In a multi-core system, one or more remaining cores in the plurality of cores may share a performance state-dependent resource such as clock frequency or core voltage with the selected processor core. If so, block 64 provides for determining whether each of the remaining cores sharing the resource have requested at least one of the target performance state and a state that is shallower than the target performance state. For example, the determination at block 64 might compare a target performance state of P0 to a requested core state of P1 and determine that the answer is "No".

In such a case, block 66 provides for logging the occurrence. The statistics of these occurrences could be used to tune the scheduling policy. For example, the scheduling policy could be tuned by lowering the maximum priority level (i.e., decreasing the value of "M") if the ratio of constrained transitions to successful transitions is too high. Such a technique would reduce the probability of constrained transitions and enable more effective use of the range of performance states.

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method comprising:
selecting a thread for execution;
identifying a target performance state based on the thread;
selecting a processor core from a plurality of processor cores;
initiating a transition of the processor core to the target performance state if the processor core is not in the target performance state and none of the remaining cores in the plurality of cores shares a performance state-dependent resource and has a second target performance state that is shallower than the target performance state; and
scheduling the thread for execution by the processor core.

2. The method of claim 1, wherein the identifying includes applying a priority of the thread to a mapping policy to obtain the target performance state.

3. The method of claim 2, further including modifying the mapping policy based on a number of threads in a thread run queue.

4. The method of claim 3, wherein the modifying includes increasing a performance characteristic of the mapping policy if the number of threads is above a threshold.

5. The method of claim 3, wherein the modifying includes increasing a power saving characteristic of the mapping policy if the number of threads is below a threshold.

6. The method of claim 1, wherein the identifying includes identifying an Advanced Configuration and Power Interface (ACPI) P-state.

7. The method of claim 1, wherein the selecting includes searching a thread run queue for a thread having a highest priority.

8. An apparatus comprising:
a processor core within a plurality of processor cores;
scheduling logic to select a thread for execution and identify a target performance state based on the thread, and to schedule the thread for execution by the processor core; and
a performance state controller, the scheduling logic to send a signal to the controller to initiate a transition of the processor core to the target performance state if the processor core is not in the target performance state and none of the remaining cores in the plurality of cores shares a performance state-dependent resource and has a second target performance state that is shallower than the target performance state.

9. The apparatus of claim 8, wherein the scheduling logic is to apply a priority of the thread to a mapping policy to obtain the target performance state.

10. The apparatus of claim 9, wherein the scheduling logic is to modify the mapping policy based on a number of threads in a thread run queue.

11. The apparatus of claim 10, wherein the scheduling logic is to increase a performance characteristic of the mapping policy if the number of threads is above a threshold.

12. The apparatus of claim 10, wherein the scheduling logic is to increase a power saving characteristic of the mapping policy if the number of threads is below a threshold.

13. The apparatus of claim 8, wherein the scheduling logic is to identify an Advanced Configuration and Power Interface (ACPI) P-state.

14. The apparatus of claim 8, further including a thread run queue, the scheduling logic to search the thread queue for a thread having a highest priority.

15. A system comprsing:
a random access memory to store instructions;
a chipset coupled to the random access memory;
a processor, within a plurality of processor cores, coupled to the chipset, the processor having a core and scheduling logic to select a subset of the instructions as a thread for execution and identify a target performance state based on the thread and schedule the thread for execution by the processor core; and
a performance state controller, the scheduling logic to send a signal to the controller to initiate a transition a transition of the processor core to the target performance state if the processor core is not in the target performance state and none of the remaining cores in the plurality of cores shares a performance state-dependent resource and has a second target performance state that is shallower than the target performance state.

16. A method comprising:
searching a thread run queue for a thread having a highest priority;
applying the priority of the thread to a mapping policy to obtain a target Advanced Configuration and Power Interface (ACPI) P-state;
selecting a processor core from a plurality of processor cores;
initiating a transition of the processor core to the P-state if the processor core is not in the P-state and none of the remaining cores in the plurality of cores shares a P-state-dependent resource with the processor core and has a second target P-state that is shallower than the target P-state; and
scheduling the thread for execution by the processor core is in the P-state.

17. The method of claim 16, further including modifying the mapping policy based on a number of threads in the thread run queue.

18. The method of claim 17, wherein the modifying includes increasing a performance characteristic of the mapping policy if the number of threads is above a threshold.

19. The method of claim 17, wherein the modifying includes decreasing a performance characteristic of the mapping policy if the number of threads is below a threshold.

20. A computer readable medium comprising a stored set of instructions which if executed are operable to:
select a thread for execution;
identify a target performance state based on the thread;
select a processor core from a plurality of processor cores;
initiate a transition of the processor to the target performance state if the processor core is not in the target performance state and none of the remaining cores in the plurality or cores shares a performance state-dependent resource and has a second target performance state that is shallower than the target performance state; and
schedule the thread for execution by the processor core.

* * * * *

UNITED STATES PATENT AND TRADEMARK OFFICE
CERTIFICATE OF CORRECTION

PATENT NO. : 7,526,661 B2  Page 1 of 1
APPLICATION NO. : 11/003561
DATED : April 28, 2009
INVENTOR(S) : Jun Nakajima et al.

It is certified that error appears in the above-identified patent and that said Letters Patent is hereby corrected as shown below:

On the Title Pg, Item (73), under "Assignee", line 1, delete "Santa Clarra," and insert -- Santa Clara, --, therefor.

On the Title Pg, Item (56), under "Other Publications", line 1, delete "(Title:" and insert -- Title: --, therefor.

On the Title Pg, Item 56), under "Other Publications", line 1, delete "Consumpton" and insert -- Consumption --, therefor.

In column 6, line 10, in Claim 15, delete "comprsing:" and insert -- comprising: --, therefor.

Signed and Sealed this

Sixteenth Day of March, 2010

David J. Kappos
*Director of the United States Patent and Trademark Office*